United States Patent
Ren et al.

(10) Patent No.: US 11,790,404 B2
(45) Date of Patent: Oct. 17, 2023

(54) METHODS, APPARATUSES AND COMPUTER PROGRAM PRODUCTS FOR PROVIDING MEGATAXON-BASED INVERTED INDEX FEATURES FOR NEURAL NETWORKS

(71) Applicant: Meta Platforms, Inc., Menlo Park, CA (US)

(72) Inventors: Wenyu Ren, Sunnyvale, CA (US); Quan Zhou, Sunnyvale, CA (US); Chihoon Lee, Sunnyvale, CA (US); Haiyu Lu, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/143,643

(22) Filed: Jan. 7, 2021

(65) Prior Publication Data
US 2022/0215440 A1    Jul. 7, 2022

(51) Int. Cl.
*G06Q 30/02* (2023.01)
*G06Q 30/0251* (2023.01)
*G06Q 30/0241* (2023.01)
*G06N 3/04* (2023.01)

(52) U.S. Cl.
CPC ........... *G06Q 30/0271* (2013.01); *G06N 3/04* (2013.01); *G06Q 30/0255* (2013.01); *G06Q 30/0277* (2013.01)

(58) Field of Classification Search
CPC ................ G06Q 30/02–0277; G06N 3/04
See application file for complete search history.

(56) References Cited

U.S. PATENT DOCUMENTS

| 7,647,299 B2 | 1/2010 | Harik |
| 8,825,853 B1 | 9/2014 | Konig et al. |
| 9,070,141 B2 | 6/2015 | Hua et al. |

(Continued)

FOREIGN PATENT DOCUMENTS

WO    WO-2019171128 A1 *   9/2019   ......... G06K 9/00228

OTHER PUBLICATIONS ip.com "Marketing Spot Optimization" Jul. 19, 2013 (Year: 2013).*

(Continued)

*Primary Examiner* — Raquel Alvarez
(74) *Attorney, Agent, or Firm* — BakerHostetler

(57) ABSTRACT

An online system for determining advertisements for retrieval is disclosed. The online system may assign a unique category path associated with a hierarchy of advertisement categories to a plurality of advertisements accessible by the online system to determine advertisement information features. The online system may determine a plurality of types of user engagements associated with prior user interactions by a user with one or more of the advertisements or types of advertisements associated with the advertisements to determine a set of user engagement features. The online system may select user engagement features, from the set, based on determined user engagement results to obtain user related features. The online system may associate the user related features with an assigned unique category path, associated with the ad information features, to generate inverted index features. The online system may apply the inverted index features as inputs to a neural network.

20 Claims, 12 Drawing Sheets

(56) References Cited

U.S. PATENT DOCUMENTS

| | | |
|---|---|---|
| 9,317,812 B2 | 4/2016 | Kabiljo et al. |
| 10,628,432 B2 | 4/2020 | Guo et al. |
| 2012/0166532 A1 | 6/2012 | Juan et al. |
| 2014/0156360 A1 | 6/2014 | Shalita et al. |
| 2021/0272155 A1* | 9/2021 | Izrailev .............. G06Q 30/0261 |

OTHER PUBLICATIONS

Huang et al., "C-3PO: Click-sequence-aware DeeP Neural Network (DNN)-based Pop-uPs Recommendation" Computers and Society, Dec. 20, 2018, 7 pages; Retrieved from https://arxiv.org/pdf/1803.00458.pdf.

Guo et al., "DeepFM: A Factorization-Machine based Neural Network for CTR Prediction" Mar. 13, 2017, 8 pages, Retrieved from https://arxiv.org/pdf/1703.04247.pdf.

* cited by examiner

500

| Term | Ad ID List |
|---|---|
| Index category: 1 | → A, C |
| Index category: 2 | → B |
| Index category: 3 | → D |

Inverted Index
FIG. 5A

505

| Document ID | Term List |
|---|---|
| A | → 1 |
| B | → 2 |
| C | → 1 |
| D | → 3 |

Forward Index
FIG. 5B

702 — F3_ADFINDER_USER_ADS_CONTENT_UNDERSTANDING_USER_CLICKED_I18N_ADS_CATEGOR
F3_ADFINDER_USER_ADS_CONTENT_UNDERSTANDING_USER_CLICKED_I18N_ADS_CATEGOR
704 — F3_ADFINDER_USER_ADS_CONTENT_UNDERSTANDING_USER_IMPS_I18N_ADS_CATEGORIES
F3_ADFINDER_USER_ADS_CONTENT_UNDERSTANDING_USER_IMPS_I18N_ADS_CATEGORIES
F3_ADFINDER_USER_ADS_CONTENT_UNDERSTANDING_USER_OFFSITE_CONV_I18N_ADS_CA
F3_ADFINDER_USER_ADS_CONTENT_UNDERSTANDING_USER_OFFSITE_CONV_I18N_ADS_CA
F3_ADFINDER_USER_ADS_CONTENT_UNDERSTANDING_USER_ONSITE_EVENTS_I18N_ADS_C
F3_ADFINDER_USER_ADS_CONTENT_UNDERSTANDING_USER_ONSITE_EVENTS_I18N_ADS_C

LIST 700

FIG. 7

| # | Megataxon feature | User-side features | Ad-side features | Weight | Threshold |
|---|---|---|---|---|---|
| 1 | DW_MEGATAXON_AD_CLICK_D1 | F3_ADFINDER_USER_ADS_CONTENT_UNDERSTANDING_USER_CLICKED_I18N_ADS_CATEGORIES_USER_ENGAGED_ADS_CLICK_COUNT_D1_FULL | | 1 | 1 |
| 2 | DW_MEGATAXON_AD_CLICK_D7 | F3_ADFINDER_USER_ADS_CONTENT_UNDERSTANDING_USER_CLICKED_I18N_ADS_CATEGORIES_USER_ENGAGED_ADS_CLICK_COUNT_D7_FULL | MegaTaxon Category Path | 1 | 1 |
| 3 | DW_MEGATAXON_AD_IMPRESSION_D7 | F3_ADFINDER_USER_ADS_CONTENT_UNDERSTANDING_USER_JMPS_I18N_ADS_CATEGORIES_USER_ENGAGED_ADS_IMPRESSION_COUNT_D7_FULL | | 1 | 1 |
| 4 | DW_MEGATAXON_ONSITE_EVENT_D7 | F3_ADFINDER_USER_ADS_CONTENT_UNDERSTANDING_USER_ONSITE_EVENTS_I18N_ADS_CATEGORIES_USER_ENGAGED_ADS_ONSITE_EVENT_COUNT_D7_FULL | GSF_IDLIST_ADU_ADTAXON_I18N_PREDICTION_TOP1_ID_L7 | 1 | 1 |

TABLE 800

FIG. 8

| | L2 Feature Name | Original User-side Feature Max Length | Truncated User-side feature length |
|---|---|---|---|
| 1 | DW_MEGATAXON_AD_CLICK_D1 | 2 | No truncation |
| 2 | DW_MEGATAXON_AD_CLICK_D7 | 6 | No truncation |
| 3 | DW_MEGATAXON_AD_IMPRESSION_D7 | 60 | 5 |
| 4 | DW_MEGATAXON_ONSITE_EVENT_D7 | 34 | 5 |

TABLE 1000

FIG. 10

METHODS, APPARATUSES AND COMPUTER PROGRAM PRODUCTS FOR PROVIDING MEGATAXON-BASED INVERTED INDEX FEATURES FOR NEURAL NETWORKS

TECHNOLOGICAL FIELD

Exemplary embodiments of this disclosure relate generally to methods, apparatuses and computer program products for the distribution of content items in online systems, and in particular, to neural network based distribution of content items.

BACKGROUND

Online systems, for example, social networking systems may provide content items (e.g., advertisements, etc.) to users for presentation, and user interaction. The retrieval of content items by the online system to present to users may initially occur in response to a content request. In response to the request, the online system may identify content items potentially relevant to users, which oftentimes causes the online system to evaluate and retrieve/fetch potentially millions of content items. The evaluation of such inordinately large volume of content items may increase the latency (e.g., delay time) of content retrieval, and thus content presentation to user devices, by the online system. Such latency by an online system may also result in poor user experience due to delay in being presented content. Additionally, the latency associated with retrieval of such large volume of content items may also cause the online system to inefficiently constrain processing resources.

In view of the foregoing drawbacks, it may be beneficial to provide an efficient and reliable mechanism to minimize latency regarding content retrieval in an online system.

BRIEF SUMMARY

Exemplary embodiments are described for detecting one or more candidate advertisements (ads) for retrieval and/or presentation to one or more corresponding users of an online system. In this regard, during an ads retrieval process, the exemplary embodiments may utilize inputs to a neural network such as a Deep Neural Network (DNN) to consider which advertisements or types of advertisements to retrieve for a specific user(s) of the online system. In an exemplary embodiment, the DNN may be a Deep and Wide Neural Network (DWNN) which has a Wide part that considers user interactions with content such as for example advertisements in making determinations as to which ads, being considered during an ads retrieval instance, to retrieve as candidates for presentation to a user(s).

The exemplary embodiments may utilize inverted index features based on a Megataxon hierarchal taxonomy as inputs to a DWNN model (e.g., a neural network machine learning model) for determining relevant ads for retrieval and/or presentation to a user(s) during an ads retrieval instance. The Megataxon hierarchal taxonomy may be associated with hierarchical categories of ads that correspond to one or more advertisements identified in a content indication such as, for example, an Ads list and may be stored in an inverted index database. The Megataxon based inverted index features may capture/include prior user interactions with content associated with multiple different user engagement types such as, for example, click engagement, impressions, events associated with user activity, etc. As such, by applying the Megataxon based inverted index features as inputs to a DWNN, the exemplary embodiments may enable fast computations associated with ad retrieval and may improve the semantic relevance of ads being retrieved for a user(s).

In one example embodiment, a method for determining advertisements for retrieval is provided. The method may include assigning a unique category path associated with a hierarchy of advertisement categories to a plurality of advertisements accessible by an online system to determine ad information features. The method may further include determining a plurality of types of user engagements associated with prior user interactions by a user with one or more of the advertisements, or types of advertisements associated with the advertisements, to determine a set of user engagement features. The method may further include selecting a plurality of the user engagement features, from the set, based on determined user engagement results to obtain user related features. The method may further include associating the user related features with the unique category path, associated with the ad information features, to generate inverted index features. The method may further include applying the inverted index features as inputs to a neural network.

In another example embodiment, a computer program product for determining advertisements for retrieval is provided. The computer program product includes at least one computer-readable storage medium having computer-executable program code instructions stored therein. The computer-executable program code instructions may include program code instructions configured to assign a unique category path associated with a hierarchy of advertisement categories to a plurality of advertisements accessible by an online system to determine ad information features. The computer program product may further include program code instructions configured to determine a plurality of types of user engagements associated with prior user interactions by a user with one or more of the advertisements, or types of advertisements associated with the advertisements, to determine a set of user engagement features. The computer program product may further include program code instructions configured to select a plurality of the user engagement features, from the set, based on determined user engagement results to obtain user related features. The computer program product may further include program code instructions configured to associate each of the user related features with the unique category path, associated with the ad information features, to generate inverted index features. The computer program product may further include program code instructions configured to apply the inverted index features as inputs to a neural network.

In yet another example embodiment, a system for determining advertisements for retrieval is provided. The system may include a device including one or more processors and a memory including computer program code instructions. The memory and computer program code instructions are configured to, with at least one of the processors, cause the device to at least perform operations including assigning a unique category path associated with a hierarchy of advertisement categories to a plurality of advertisements accessible by the device to determine ad information features. The memory and computer program code are also configured to, with the processor, cause the device to determine a plurality of types of user engagements associated with prior user interactions by a user with one or more of the advertisements, or types of advertisements associated with the advertisements, to determine a set of user engagement features. The memory and computer program code are also configured to, with the processor, cause the device to select a plurality of the user engagement features, from the set, based on determined user engagement results to obtain user related features. The memory and computer program code are also configured to, with the processor, cause the device to associate each of the user related features with the unique category path, associated with the ad information features, to generate inverted index features. The memory and computer program code are also configured to, with the processor, cause the device to apply the inverted index features as inputs to a neural network.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIG. 5A is a diagram of an exemplary inverted index in accordance with an embodiment.

FIG. 5B is a diagram of an exemplary forward index.

FIG. 7 is a diagram of an exemplary table illustrating a list of user-side features in accordance with an embodiment.

FIG. 8 is a diagram of an exemplary table illustrating Megataxon inverted index features in accordance with an embodiment.

FIG. 10 is a diagram of an exemplary table illustrating truncated Megataxon user-side features in accordance with an embodiment.

Figure 1:
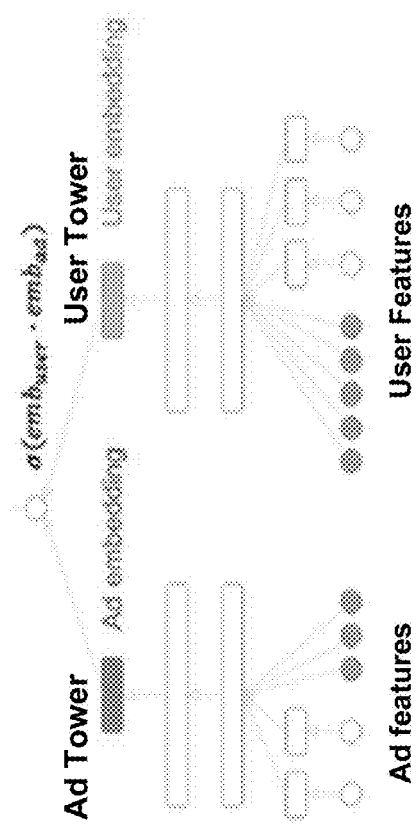
FIG. 1 is a diagram of an exemplary Two Tower Sparse Neural Network.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As defined herein "Megataxon," "Megataxon hierarchy," or "Megataxon category hierarchy," may be used interchangeably and may refer to a hierarchical taxonomy associated with products, services, content topics and/or other content items. The Megataxon may provide a precise and effective categorization system associated with various document types, in which each of the categories of the Megataxon may be arranged in a hierarchical tree structure. In some example embodiments described herein, a specific document type may be associated with a category that relates to an advertisement(s). In this regard, a category associated with an ad may denote a product(s), service(s), content topic(s) and/or other content item(s) that the advertisement is promoting.

It is to be understood that the methods and systems described herein are not limited to specific methods, specific components, or to particular implementations. It is also to be understood that the terminology used herein is for the purpose of describing particular embodiments only and is not intended to be limiting.

Overview

An online system, such as a social network system may distribute content to users of the online system and/or third-party systems. In this regard, the online system may receive content items such as advertisements from one or more content providers. The online system may retrieve one or more of the advertisements that are determined to be relevant for presentation to one or more users of the online system.

Some existing online systems may utilize a Two Tower Sparse Neural Network (TTSN) model as an ads retrieval model to retrieve/fetch ads for users. The TTSN model may be a machine learning model that serves as a mechanism to personalize ads that are specific to one or more users of the online system. In this regard, the TTSN model may retrieve ads determined to be relevant for each of one or more users of an online system and may rank the ads for each user based on scores determined by the TTSN model.

Referring to FIG. 1, a diagram illustrating an example of a TTSN model is provided. As shown in FIG. 1, the TTSN model has two towers. A first tower is an Ad embedding tower responsible for determining an embedding (e.g., a set) of one or more relevant ads being considered for a user(s). A second tower is a User embedding tower responsible for determining the embedding for the user being considered for retrieval/presentation of an ad(s). The embeddings may be product determinations of machine learning processes implemented by the TTSN that are tuned in dimensions (d), where each embedding has a vector (v) as a real-value $R^d$. An illustrative example of an embedding for a user (i.e., User embedding) in 2 dimensions is v1=(0.4, −2.4) and v2=(0.4, −2.3) associated with an Ad embedding, that relates to one ad, when d is 2. In this example, the dimension d=2 is the size of the embedding space quantifying how much user/ad information may be encoded by the embedding vectors, e.g., a higher d allows capturing of more information. The similarity between the User embedding v1 and Ad embedding v2 indicates the relevance of the ad to the corresponding user. One example similarity measure is the cosine of the angle spanned by v1 and v2 in the embedding space, which equals ~0.99 for this example, indicating very strong relevance of the ad to the corresponding user (e.g., the higher the similarity measure is, the more relevant the ad is to the user). The TTSN model may determine the sigmoid function $\sigma(emb_{user} \cdot emb_{ad})$ of the dot product of the user side and ad side embeddings. In this manner, the TTSN model may determine whether the user and the ad are relevant to each other. During the machine learning processes, a user such as an engineer may initially determine an optimal setting of the dimension d, and input features (e.g. Ad features, User features shown in FIG. 1) which may subsequently correspond to Ad embedding and User embedding. For instance, the machine learning processes may subsequently optimize the manner in which the input features are used to determine the embeddings by driving the Ad embedding and the User embedding closer (or more distant) in $R^d$ as to whether an ad is likely (or unlikely) to be retrieved for presentation to a user. The distance between Ad embedding and User embedding is determined by the function $\sigma(emb_{user} \cdot emb_{ad})$. The determined distance may facilitate determining how relevant the ad may be to the user. For instance, the more the distance is between the Ad embedding and the User embedding, the less relevant the ad may be to the user. On the other hand, the closer the distance between the Ad embedding and the User embedding, the more relevant the ad may be to the user. The machine learning processes may utilize a ground truth label such as, for example, 1 or 0 to denote whether an ad is clicked by the user or not. For example, a ground truth label of 1 may denote that the ad is clicked by the user, whereas the ground truth label of 0 may denote that the ad is not clicked by the user. As a result, $\sigma(emb_{user} \cdot emb_{ad})$ may indicate the relevance between a user and an ad at a high level, therefore the TTSN model leverages $\sigma(emb_{user} \cdot emb_{ad})$ to determine the set of most relevant ads for a given user(s). However, the TTSN model does not fully capture the interactions between a user and an ad, which may be beneficial to improve the relevance prediction quality for a given user-ad pair.

In some exemplary embodiments, an online system may utilize Deep and Wide Neural Networks models which may analyze user-ad interactions in retrieving advertisements relevant to users of the online system. The DWNN model may be a machine learning model capable of retrieving advertisements relevant to users.

Figure 2:
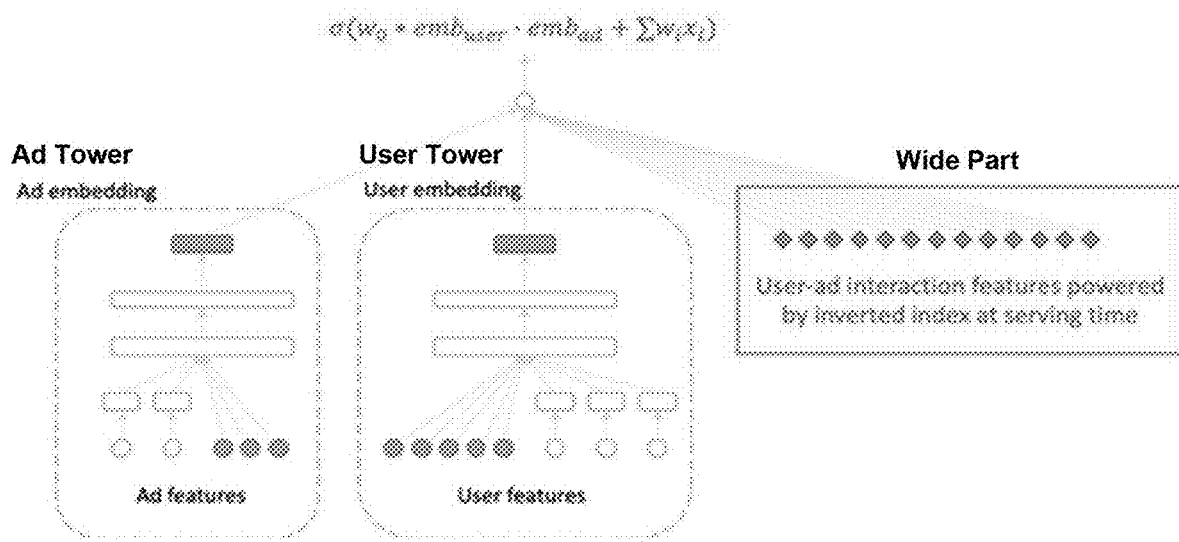
FIG. 2 is a diagram of an exemplary Deep & Wide Neural Network in accordance with an embodiment.

Referring to FIG. 2 an example of a DWNN model according to an exemplary embodiment is provided. As shown in FIG. 2, the DWNN model 200 differs from the TTSN model in that the DWNN model has a Wide part in addition to two towers that are similar to the two towers of the TTSN. In this regard, the Deep part of the DWNN model includes the Ad tower which projects ad features in an Ad embedding space and the User tower which projects user features in a User embedding space to make predictions similar to the TTSN as described above.

The Wide part of the DWNN model structure includes an array of user-ad, or request-ad, interaction features (also referred to herein as user interaction features) which are incorporated into a final prediction in the form of a linear combination with the Ad embedding features, the User embedding features, and interaction features. In other words, a final prediction regarding relevancy of ads for presentation to a user(s) may be based on the combination of two factors—the first factor is the dot product between a User embedding and Ads embedding (which is similar to the TTSN model), and the second factor is a summary of user interaction features. The combination of the two factors may be represented linearly as shown in FIG. 2. Each of the linear weights $w_0$ and W, in the combination may be optimized by the machine learning processes which may minimize the loss between the final outcome from a prediction and a ground truth. In this regard, the prediction p is the prediction result determined by the DWNN model as to whether a user is likely to click on one ad and the ground truth q may indicate whether the user actually clicked the ad or not. The loss may capture the difference between the prediction p and the ground truth q. One example is the cross entropy loss widely used in recommendation models, which is defined as $loss_{cross\_entropy} = -q\log p - (1-q)\log(1-p)$. The lower the loss is, the more accurate the model prediction p may be, namely closer to the ground truth q. In one example, when p=0.1 and q=1.0, the loss is close to 2.30. In another example, the loss is small (e.g., almost close to 0), when p=0.9999 and q=1.0, as the values of p and q are similar in this example. In this regard, for example, the prediction regarding the relevancy of an ad(s) may be determined by $\sigma(w_0 * emb_{user} \cdot emb^{ad} + W \cdot interFeatures_{user\_ad})$, where $w_0$ is a value, W is a k dimensional vector and $interFeatures_{user\_ad}$ is a k dimensional vector that is provided as input features such as user interaction features to the DWNN model. The parameter $interFeatures_{user\_ad}$ may be referred to herein interchangeably as $\Sigma w_i x_i$. (See e.g., FIG. 2). The user interaction features may be based, in part, on tracked prior history of the interactions that a user had with one or more advertisements or types of advertisements. The direct usage of user interaction features by DWNN models is an improvement over the TTSN model. For instance, by utilizing the user interaction features, the DWNN model may identify/determine more relevant ads for users.

Applicant has identified that during ads retrieval, which may be an initial stage of an ads delivery process by an online system, millions of ads may need to be processed within a tight latency constraint, for example, much less than a millisecond. To complicate matters regarding the latency constraint, the user interaction features (e.g., the Wide part features) that the DWNN model may depend on are typically unable to be generated until the online system receives requests from users. The high volume of ads traffic (e.g., millions of ads) to process upon ads retrieval combined with the additional processing associated with determining user interaction features in the ads retrieval stage may present an obstacle to utilizing user interaction features, in a DWNN model, in terms of computational efficiency/cost. The processing associated with determining the user interaction features during the ads retrieval stage may inefficiently constrain processing resources of the online system. Applicant has developed effective and innovative inverted index (I2) features for usage to determine the user interaction features of the Wide part of the DWNN model during serving/request time for ads retrieval, which may reduce latency and conserve the processing resources of the online system.

The inverted index features may be representations of advertisement information features (also referred to herein as ad-side features) and user information features (also referred to herein as user-side features). The inverted index features may be utilized to determine the user interaction features associated with a corresponding user(s) by matching the user-side and ad-side features for the user efficiently in response to an ad request at ad retrieval time/instance, as described more fully below. By matching user-side with ad-side features based on the inverted index features, latency by the online system in retrieving ads may be reduced (which may enable faster ads retrieval) and computing capacity of processing resources of the online system may be conserved. Reducing latency and conserving processing resources in an online system is important to improving any implementation of a neural network such as, for example, a DWNN in retrieving advertisements for presentation to devices/users.

In an instance in which the inverted index features of the exemplary embodiments are not utilized, the values of user-side features may need to be matched with ad-side features, in a brute-force manner for each user-ad pair, which is time-consuming, computationally-intensive, and constrains processing resources. However, by utilizing the inverted index features of the exemplary embodiments, an online system may perform tailored searches for retrieval of candidate ads that are associated with user-side features and ad-side features that have a common path associated with ads, or similar types of ads, that a user has engaged with previously, which may significantly reduce latency and conserve processing resources.

System Architecture

Figure 3:
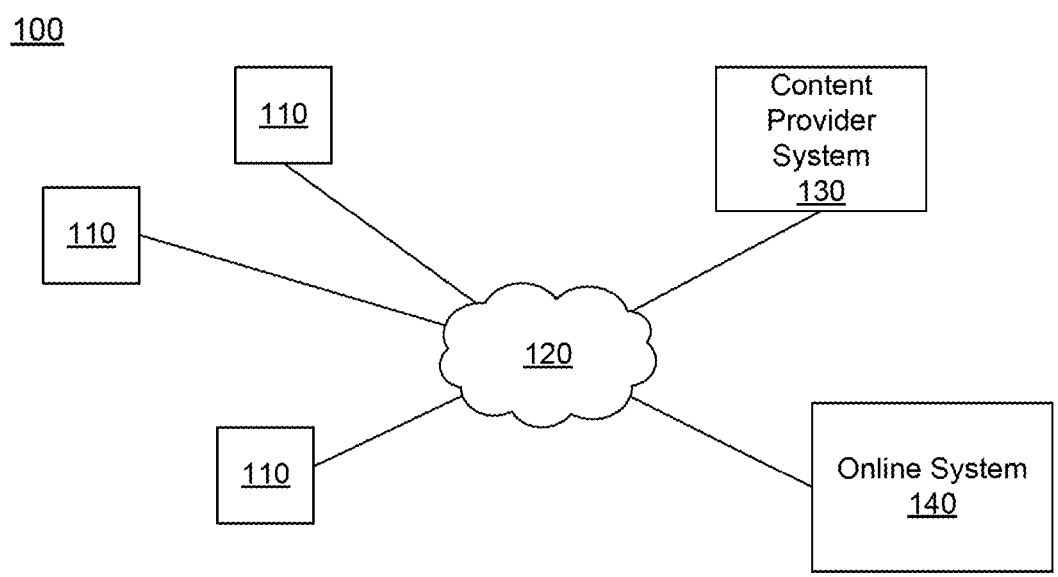
FIG. 3 is a block diagram of a system environment in which an online system operates, in accordance with an embodiment.

FIG. 3 is a block diagram of a system environment 100 for an online system 140. The system environment 100 shown by FIG. 3 comprises one or more client devices 110, a network 120, one or more content provider systems 130, and the online system 140. In alternative configurations, different and/or additional components may be included in the system environment 100. For example, there may be a large number of client devices 110 and content provider systems 130 interacting with the online system 140.

The online system 140 provides certain types of services to users via client devices 110. As illustrated in FIG. 3, the online system 140 provides content to one or more client devices 110 via the network 120. The online system 140 may provide other services in addition to providing content. For example, the online system 140 may enable users to interact with other users of the online system 140, share content, and post comments. In additional embodiments, the online system 140 may enable users to make purchases, interact with content provided by a content provider system 130. In an embodiment, the online system 140 may be a social networking system and allows users to establish connections with other users of the social networking system, interact with the connections of the user, receive information describing various actions performed by the connections of the user, and interact with content provided by the content provider system 130 on the social networking system via network 120. In other embodiments described herein, the online system may be adapted to systems other than social networking systems.

The online system 140 may receive requests from one or more client devices 110 and may send web pages to the client devices 110 via the network 120 in response. Here, each of the one or more client devices 110 is associated with a user of the online system 140 and enables interactions between the user and the online system 140. The online system 140 may also receive one or more content items from one or more content provider systems 130. The received content items may comprise a text message, a picture, a hyperlink, a video, an audio file, or some combination thereof. The online system 140 may include the received one or more content items in web pages sent to the client device 110. For example, the online system 140 may present a newsfeed to the client device 110 where the newsfeed includes the one or more received content items. In some embodiments, the content items received by the online system 140 from the content provider system 130 may be promotional content or sponsored content. For example, the received content items may be an advertisement. Accordingly, a content provider system 130 may provide remuneration to the online system 140 for publishing the one or more content items associated with the content provider system 130.

The client devices 110 are one or more computing devices capable of receiving user input as well as transmitting and/or receiving data via the network 120. A client device is also referred to herein as a user device. In one exemplary embodiment, a client device 110 may be a computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 may execute an application allowing a user of the client device 110 to interact with the online system 140. For example, a client device 110 may execute a browser application to enable interaction between the client device 110 and the online system 140 via the network 120. In another embodiment, a client device 110 interacts with the online system 140 through an application programming interface (API) or a software development kit (SDK) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 may use standard communications technologies and/or protocols. For example, the network 120 may include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as, for example, hypertext markup language (HTML) or extensible markup language (XML). In some embodiments, all or some of the communication links of the network 120 may be encrypted using any suitable technique or techniques.

One or more content provider systems 130 may be coupled to the network 120 for communicating with the online system 140, which is further described below in conjunction with FIG. 4. In one embodiment, a content provider system 130 may provide content or other information for presentation via a client device 110. In other embodiments, content provider system 130 may be an application provider communicating information describing applications for execution by a client device 110 or communicating data to client devices 110 for use by an application executing on the client device 110. A content provider system 130 also may communicate information to the online system 140, such as advertisements, content, or information about an application provided by the content provider system 130.

In various embodiments a user associated with a client device 110 may interact with the online system 140 via the client device 110. Interactions between a user associated with a client device 110 and the received one or more content items may include a click, an impression (e.g., scrolling through or hovering over content items), a like, and a share with other users of the online system 140 connected to the user via the online system 140. The online system 140 may configure a web page for sending to the user device 110. The online system 140 may configure the web page such that a portion of the web page is used for providing the information requested by the user or for receiving user interactions specific to the features offered by the online system 140. The online system 140 may configure the web page such that at least a portion of the web page is available for presenting one or more content items received from a third party such as the content provider system 130. The online system 140 may include a link to the content item in the web page for allowing the user to access the content item using the link.

The online system 140 may provide content distribution from content provider systems 130 to users via client devices 110, as further described below. For instance, the online system 140 may receive content such as, for example, advertisements from content provider systems 130 via network 120 and may process the received content. The online system 110 may identify users of the online system 140 to whom content should be provided. The online system 140 may utilize a neural network such as, for example, a DWNN with inverted index features to retrieve relevant advertisements to provide the users via client devices 110, as described more fully below.

Figure 4:
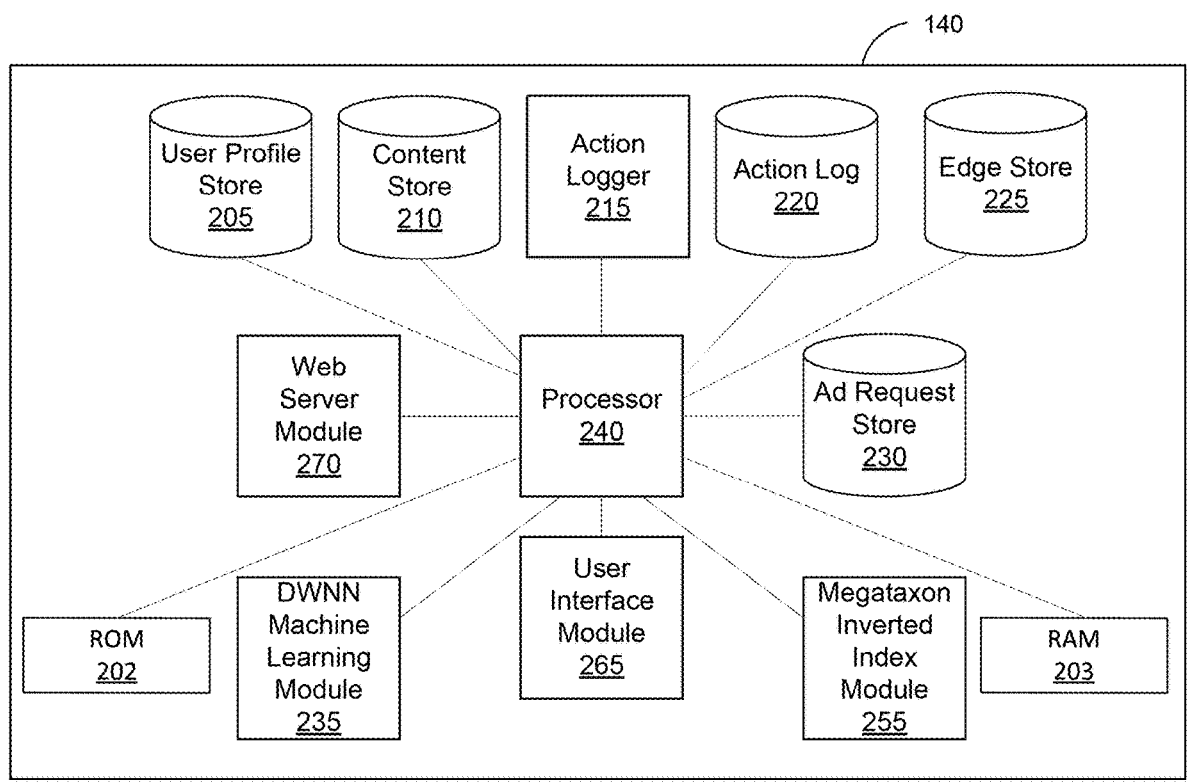
FIG. 4 is a block diagram of an online system, in accordance with an embodiment.

FIG. 4 is a block diagram of an architecture of the online system 140. The online system 140 is also referred to herein as network device 140. In some exemplary embodiments each of the components of FIG. 4 may be embodied within an integrated entity/device (e.g., a network server) of the online system 140. In other exemplary embodiments, one or more of the components of FIG. 4 may be discrete stand-alone components of the online system 140. The online system 140 shown in FIG. 4 includes one or more processors 240, a read-only memory (ROM) 202, a random access memory (RANI) 203, a user profile store 205, a content store 210, an action logger 215, an action log 220, an edge store 225, an ad request store 230, a user interface module 265, a web server module 270, a DWNN machine learning module 235, and a Megataxon inverted index module 255. In other embodiments, the online system 140 may include additional, fewer, or different components for various applications. Components such as network interfaces, security functions, load balancers, failover servers, management and network operations consoles, and the like are not shown so as to not obscure the details of the system architecture. The one or more processors 240 may execute instructions of a computer program to perform any of the features described herein for the online system 140. The instructions may be stored in any type of computer-readable medium or memory, to configure the operation of the processor(s) 240. For example, instructions may be stored in the ROM 202, the RAM 203, removable media, such as a Universal Serial Bus (USB) drive, compact disk (CD) or digital versatile disk (DVD), floppy disk drive, or any other desired electronic storage medium. Instructions may also be stored in an attached (or internal) hard drive.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 may be frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. In some exemplary embodiments, content items such as, for example, advertisements may be received from one or more content provider systems 130. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in the content provider system 130 that communicate information to the online system 140. Users may interact with various objects in the online system 140, and information describing these interactions is stored in the action log 220. Examples of interactions with objects include: commenting on posts, sharing links, checking-in to physical locations via a mobile device which may identify the location (e.g., geolocation) of the mobile device to the online system, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a content provider system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a content provider system 130, including webpage viewing histories, advertisements that were engaged, purchases made, and other patterns from shopping and buying. Additionally, actions a user performs via an application associated with a content provider system 130 and executing on a client device 110 may be communicated to the action logger 215 for storing in the action log 220 by the application for recordation and association with the user by the online system 140.

In one embodiment, the edge store 225 may store information describing connections between users and other objects in the online system 140 as edges. Some edges may be defined by users, allowing users to specify their relationships with other users. For example, users may generate edges with other users that parallel the users' real-life relationships, such as friends, coworkers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object (e.g., an advertisement(s), other content items), or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request may include a request associated with advertisement content. In some instances, an ad request may be automatically generated by a client device 110 and sent to the online system 140 in response to a user scrolling or hovering content presented within a user interface of the client device 110. The content presented within the user interface of the client device 110 may be provided by the online system 140 to the client device 110. The advertisement may include text, image, audio, video, or any other suitable data presented to a user. In various embodiments, the advertisement may also include a landing page specifying a network address to which a user is directed when the advertisement content is accessed. The ad request store 230 may track whether a user interacts with the advertisement in the ad request when presented to the user, or if any suitable condition is satisfied when the advertisement in the ad request is presented to a client device 110 associated with a user.

Additionally, an ad request may include one or more targeting criteria specified by the advertiser. Targeting criteria included in an ad request may specify one or more characteristics of users eligible to be presented with advertisement content in the ad request. For example, targeting criteria may be used to identify users associated with user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria also may specify interactions between a user and objects performed external to the online system 140, such as on a content provider system 130. For example, targeting criteria identifies users who have performed a particular action, such as having sent a message to another user, having used an application, having joined or left a group, having joined an event, having generated an event description, having purchased or reviewed a product or service using an online marketplace, having requested information from a content provider system 130, having installed an application, or having performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The web server module 270 may link the online system 140 via the network 120 to the one or more client devices 110, as well as to the content provider system 130 and/or one or more third party systems. The web server module 270 may serve web pages, as well as other content, such as JAVA®, FLASH®, XML and so forth. The web server module 270 may receive and route messages between the online system 140 and the client device 110, for example, instant messages, queued messages (e.g., email), text messages, short message service (SMS) messages, or messages sent using any other suitable messaging technique. The web server module 270 may receive a request from a client device 110 to upload information (e.g., images or videos) that is stored in the content store 210 or to perform an action directed towards a target entity. Additionally, the web server module 270 may provide application programming interface (API) functionality to send data directly to native client device operating systems, such as IOS®, ANDROID™, WEBOS® or BlackberryOS. The web server module 270 may receive requests from client devices 110 and process the received requests by configuring a web page for sending to the requesting client device 110. The web server module 270 may include content from content store 210 in the web page. The web server module 270 may send the configured web page for presentation via the network 120 to the client device 110. The client device 110 may receive the web page and render the web page for presentation via a display device of the client device 110.

The user interface module 265 may allow the online system 140 to interact with external systems, for example, content provider system 130 and one or more client devices 110. The user interface module 265 may import data from content provider system 130 and/or export data to the content provider system 130. For example, the user interface module 265 may receive content items from the content provider system 130. For example, the user interface module 265 may present an interface to a content provider system 130 to upload one or more content items for sending to one or more client devices 110. The user interface module 265 may additionally enable a content provider system 130 specify one or more interaction types to associate with the uploaded content. For example, a content provider system 130 may specify that a content item should be associated with clicks, impressions, shares or the like. In another example, the content provider system 130 may specify an interaction type associated with an application (app) event (e.g., app open, app close, app install, or app uninstall). In one embodiment, the user interface module 265 may be a graphical user interface (GUI) configured to receive one or more content items and one or more preferences from a content provider system 130. In other embodiments, the user interface module 265 may be configured to receive a Hypertext Transfer Protocol (HTTP) request comprising one or more content items from a content provider system 130 (e.g., POST or GET).

The DWNN machine learning module 235 may implement a DWNN model (e.g., DWNN model 200 of FIG. 2) during a content retrieval process that determines a prediction based on a product of User embedding features and Ad embedding features (e.g., $\sigma(\text{emb}_{user} \cdot \text{emb}_{ad})$) combined with user interaction features included in the Wide part of the DWNN model for respective users of the online system 140. The user interaction features may be based, in part, on determined prior interactions by a user(s) with content items (e.g., advertisements) provided by the online system 140 to the user(s). The Wide part of the DWNN utilizes inputs such as inverted index features to determine the user interaction features, as described more fully below.

In some exemplary embodiments, the DWNN machine learning module 235 may utilize training data associated with stored user interactions (e.g., stored in user profile store 205) to iteratively optimize a machine learning model of the DWNN machine learning module 235. The DWNN machine learning module 235 may retrieve ads determined to be relevant to a user(s) of the online system 140 during an ads retrieval time. An ads retrieval time/instance may occur in response to the DWNN machine learning module 235 receiving a request (e.g., an ad request). The ad request may be triggered by a user of a client device 110 scrolling through, hovering over, clicking on and/or otherwise manipulating content provided by the online system 140 to the client device 110.

The Megataxon inverted index module 255 may generate inverted index features that may be stored in an inverted index database of a memory device such as, for example ROM 202, RAM 203 and/or a memory device of the Megataxon inverted index module 255. The inverted index may be a database index storing mappings from content (e.g., advertisements) such as index categories of ads, to the location of the content (e.g., in a document, file, etc.) or a list where the content belongs, such as a list of ads IDs (e.g., a content indication). The inverted index may represent ad-side information and user-side information that may be matched, by performing searches in the inverted index, for a corresponding user in order to determine user interaction features associated with the user. The user interaction features associated with a corresponding user may be determined by the Megataxon inverted index module 255 during an ads retrieval time/instance. The Megataxon inverted index module 255 may utilize a taxonomy, or hierarchy such as a tree structure with different levels of categories of ads associated with the generated inverted index features, as described more fully below.

Exemplary System Operation

Referring to FIG. 5A, a diagram illustrating an inverted index structure according to an exemplary embodiment is shown. In the example of FIG. 5A, the Megataxon inverted index module 255 may generate the inverted index 500. The inverted index 500 may be implemented in the Wide part of a DWNN model (e.g., DWNN model 200) by the DWNN machine learning module 235 and may be utilized to determine user interaction features with content items (e.g., advertisements), as described above. The structure of the inverted index 500 may be an inverse/opposite of a structure of a forward index such as the example forward index 505 shown in FIG. 5B. The forward index 505 is an index from document ID (e.g., document A) to a list of terms (e.g., term 1). The inverted index 500 has a mapping of terms to an Ad identifier (ID) list (also referred to herein as content indication) and the terms are associated with index categories (e.g., index category 1, index category 2, index category 3). As an example, in the first row, the inverted index 500 may be index category 1 associated with an Ad ID list of ad A and ad C. In this regard, ad A and ad C belong to index category 1. In like manner, index category 2 is associated with an Ad ID list of ad B and index category 3 is associated with an Ad ID list of ad D. As such, ad B belongs to index category 2 and ad D belongs to index category 3.

As an example, for purposes of illustration and not of limitation, index category 1 may be associated with shoes and in this regard ad A may be associated with a Nike™ ad and ad C may be associated with an Adidas™ ad. As another example, for purposes of illustration and not of limitation, an index category 2 may be associated with backpacks and as such ad B may be associated with a JanSport™ backpack ad.

Additionally, as described above, the exemplary embodiments may utilize a Megataxon hierarchy to further categorize or classify advertisements for an index category. An example of an index category may be index category 1, index category 2 and index category 3 shown in FIG. 5A. The Megataxon may have multiple nodes/levels, and/or paths, and each level may be utilized to narrow down types of ads.

Figure 6:
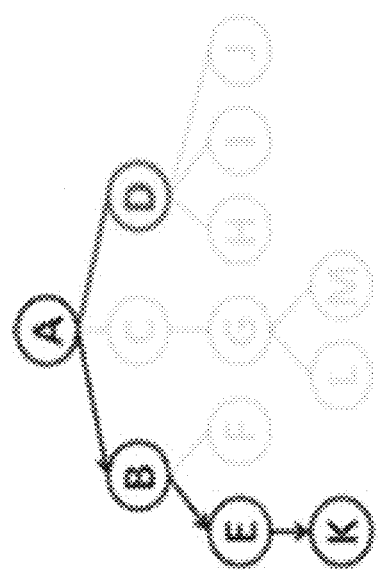
FIG. 6 is a diagram illustrating an exemplary Megataxon hierarchy in accordance with an embodiment.

Referring to FIG. 6, an example embodiment of a Megataxon hierarchy having different nodes/levels is provided. The Megataxon hierarchy of FIG. 6 is for purposes of illustration and not of limitation. The top level in the Megataxon hierarchy which is the circled A is a root node for the entire tree hierarchy. The second level in the Megataxon hierarchy such as the circled B may predict ads associated with a product. The third level in the Megataxon hierarchy such as the circled E may predict ads as apparel and shoes. The fourth level in the Megataxon hierarchy such as the circled K may predict ads as sports shoes. By utilizing a Megataxon hierarchy, multiple types of ads may be predicted by the online system 140 and narrowed down or filtered based on a lower level (e.g., third level above) associated with a corresponding path of the Megataxon hierarchy.

In an example embodiment, the Megataxon inverted index module 255 may generate Megataxon based inverted index features for an inverted index (e.g., inverted index 500) that may include user information, referred to as user-side information, and advertising information, referred to as ad-side information. The user-side information and ad-side information may form a user-ad pair of the Megataxon based inverted index features. The Megataxon inverted index module 255 may also generate matching clauses for the Megataxon inverted index features.

The ad-side features of the Megataxon inverted index features may be associated with a Megataxon Category Path name such as, for example, Category Name: GSF_IDLIST_ADU_ADTAXON_IL8N_PREDICTION_ TOP1_L0_L7. In this regard, each ad, among a plurality of ads, being considered by the Megataxon inverted index module 255 may be assigned or associated with a unique path in the Megataxon category hierarchy. A value of the ad-side features may be the hash (e.g., a key that stands) for the path in the Megataxon.

Additionally, the Megataxon inverted index module 255 may determine a list 700 of candidate user-side features (e.g., eight candidate user-side features) as shown in a table of FIG. 7. The list 700 of user-side features may be based on content items that a user has engaged with in the past. The past user engagement data may be determined by the Megataxon inverted index module 255 from prior user engagement data stored in user profile store 205. The prior user engagement data may be based on a user's prior habits regarding engagement/interaction with content items (e.g., advertisements). As shown in FIG. 7, the user-side features may include different user engagement types such as, for example, clicks, impressions (IMPS), onsite events (e.g., interaction of users with ads within a social networking platform) and offsite conversions (e.g., behavior of users on the Internet outside of the social networking platform).

In an example embodiment, the Megataxon inverted index module 255 may determine that four of the eight user-side features from the list 700 have the best prediction results over a set of users such as users of the online system 140. In this example embodiment, the four user-side features selected by the Megataxon inverted index module 255 are shown in the user-side features column of table 800 in FIG. 8. In one embodiment, the Megataxon inverted index module 255 may perform a correlation analysis on tracked data of a set of users regarding interaction with content items associated with the user-side features to determine which user-side features of the eight user-side features have the top prediction results regarding user engagement with associated content items (e.g., ads or a similar type of ads) over a time period such as for example a day, a week, etc. The Megataxon inverted index module 255 may also perform a calibration analysis to further determine the prediction power of different candidate user-side features. Based on the correlation and calibration analysis results, as well as considering computational efficiency/cost, four of the eight user-side features from the list 700 were selected by the Megataxon inverted index module 255.

The Megataxon inverted index module 255 also determined that two features 702, 704 of the four user-side features selected from the list 700, shown in FIG. 7, were the most relevant features to utilize to predict whether a user may click a similar ad(s). In this example embodiment, the Megataxon inverted index module 255 determined that four of the user-side features were the most relevant to predict user interaction with ads of a similar type. However, in other embodiments, the selection of user-side features may be other than four (e.g., three, five, etc.) based on the data being tracked regarding user interaction with content items (e.g., similar ads, or similar type of ads) associated with the user-side features for a set of users over a time period.

Referring again to FIG. 8, a table indicating Megataxon inverted index features is provided according to an exemplary embodiment. The Megataxon inverted index features are determined by the Megataxon inverted index module 255 to utilize in the Wide part, regarding user-ad interaction features, of a DWNN model (e.g., DWNN model 200). In this example embodiment shown in table 800, the Megataxon inverted index module 255 selected the four user-side features from the candidate user-side feature list 700 that are identified in the user-side features column of table 800.

The user-side feature in row 1 of table 800 associated with Megataxon inverted index feature DW_MEGATAX- ON_AD_CLICK_D1 may be based on the top prediction of ads that user, or set of users, is likely click (e.g., clicking a website link in an ad) during the time period of a day (also referred to herein as D1). The user-side feature in row 2 of table 800 associated with DW_MEGATAXON_AD_CLICK_D7 may be based on the top prediction of ads that a user, or set of users, is likely click during the time period of a week, i.e., seven days (also referred to herein as D7). The user-side feature in row 3 of table 800 associated with DW_MEGATAXON_AD_IMPRESSION_D7 may be based on the top prediction of ads that a user, or set of users, is likely to have an impression engagement with during the time period of a week. In an example embodiment, a user may have an impression engagement with an associated ad(s) in response to scrolling and/or hovering over content, presented via a user interface of a client device 110, that is associated with the ad(s) or similar ad(s) of a same type. The user-side feature in row 4 of table 800 associated with DW_MFGATAXON_ONSITE_EVENT_D7 may be based on the top prediction of ads that a user, or set of users, is likely to engage with pertaining to an onsite event during the time period of a week. For example, in an instance in which a user views an ad(s) via a client device 110 and visits an onsite location such as, for example, a store associated with the ad(s) to make a purchase, the store may send an indication of the purchase and an indication of the location where the user made the purchase, i.e., the location of the store, to the online system 140.

In the exemplary embodiment of FIG. 8, the Megataxon inverted index module 255 also determined the Megataxon Category Path for ad-side features associated with candidate ads of the online system 140 and a corresponding weight (e.g., 1) and threshold value (e.g., 1) of matching clauses for the Megataxon inverted index features, which are included in table 800.

Figure 9:
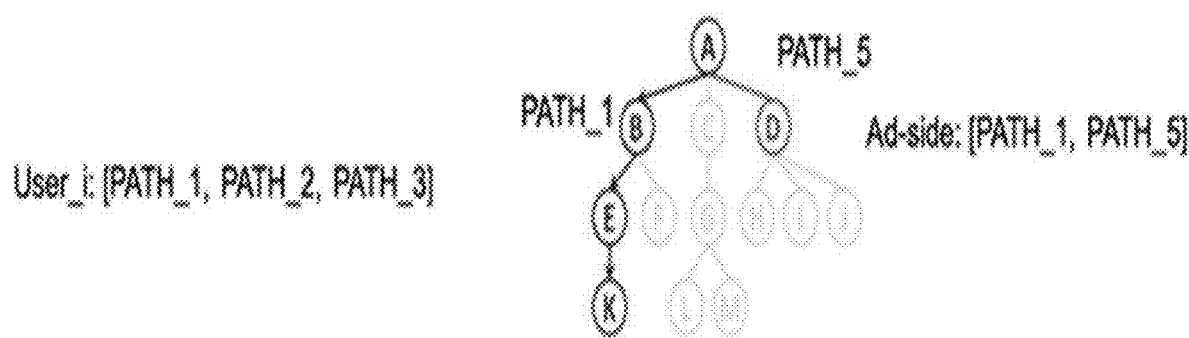
FIG. 9 is a diagram illustrating matched Megataxon user-side and ad-side paths in accordance with an embodiment.

The user-side features may be a list of Megataxon path hashes (e.g., keys that stand for Megataxon category paths). These hashes may belong to ads which a corresponding user has engaged/interacted with in the past. In order to match user-side and ad-side Megataxon inverted index features, by the Megataxon inverted index module 255, consider the following example for purposes of illustration and not of limitation. In this regard, the Megataxon inverted index module 255 may determine that for a User I (also referred to herein as user_i) has engaged with three ads whose Megataxon path hash is PATH_1, PATH_2, and PATH_3, as shown in FIG. 9. The ad-side features are also associated with a list of Megataxon path hash generated by the Megataxon inverted index module 255 such as, for example, the MegaTaxon Category Path shown in table 800 of FIG. 8. As shown in FIG. 9, the Megataxon inverted index module 255 may determine that an example ad has the path of PATH_1 and PATH_5 in the Megataxon hierarchy. To match the user-side and ad-side features, the Megataxon inverted index module 255 may determine all common paths between the user-side features and the ad-side features. In this example embodiment, the Megataxon inverted index module 255 determined that there is only one common/matched path, which is PATH_1.

For each matched Megataxon path, the predefined weight associated with a matching clause may be added to determine a total weight. In this regard, for example, a matching clause may be a clause associated with matching a pair of user-side features and ad-side features. In an instance in which the Megataxon inverted index module 255 determines that the total weight equals or exceeds a matching clause predetermined threshold value (e.g., 1), the Megataxon inverted index module 255 may determine that one or more ads associated with the user-side and ad-side inverted index features have a non-zero value for the corresponding user-ad pair. In response to determining that the one or more ads have a non-zero value, the Megataxon inverted index module 255 may retrieve the ad(s) as a candidate ad(s) for presentation to the corresponding user (e.g., User I) via a client device 110. In one example embodiment, the Megataxon inverted index module 255 may present the ad to the user via a user interface associated with a display device of the client device 110. On the other hand, if the Megataxon inverted index module 255 determines that a value is zero associated with an ad(s), the Megataxon inverted index module 255 may not retrieve and/or present the ad(s) associated with the matched path to a client device 110 of the user.

In the example of FIG. 9, the Megataxon inverted index module 255 determined that there was one common/matched path i.e., PATH_1 between the user-side features and the ad-side features. As shown in table 800 of FIG. 8, the predetermined weight associated with a matching clause is a value of 1 and predetermined threshold value associated with the matching clause is also a value of 1. Since there was one matched PATH_1 determined by the Megataxon inverted index module 255, the Megataxon inverted index module may apply the value of 1 as the total weight. The total weight having a value of 1 equals the predetermined threshold value of 1, and as such the Megataxon inverted index module 255 may assign a non-zero value to the ad(s) associated with the user-ad pair and may provide the non-zero value to the Wide part of the DWNN indicating the ad(s) as a candidate ad for retrieval and/or presentation to a corresponding user (e.g., User I) via a client device 110.

As another example in an instance in which there were two common/matched paths for a user-ad pair, the Megataxon inverted index module 255 may add the values of 1 for the two paths to obtain a total weight of value 2. Since the total weight has a value of 2, which exceeds the predetermined threshold value of 1, the Megataxon inverted index module 255 may assign a non-zero value to the ad(s) associated with the user-ad pair and may provide the non-zero value to the Wide part of a DWNN indicating the ad(s) as a candidate ad(s) for retrieval and/or presentation to a corresponding user.

As an alternative example, in an instance in which the predetermined threshold value is a value of 3, and the total weight has a value of 2, then the value of the total weight i.e., 2 is less than the predetermined threshold value 3. As such, in this alternative example, the Megataxon inverted index module 255 may assign a zero value for the ad(s) associated with the user-ad pair and may not retrieve the ad(s) for presentation to a corresponding user.

In some example embodiments, the Megataxon inverted index module 255 may truncate one or more Megataxon based inverted index features. For example, if the Megataxon based inverted index features, shown in table 800, were input directly to the Wide part of a DWNN model (e.g., DWNN model 200), such input may in some instances introduce performance degradation and inefficiently constrain processing resources as well as negatively affect the latency (e.g., increased time delay) associated with ads retrieval by the online system 140. In this regard, the Megataxon inverted index module 255 may implement a technique to alleviate or minimize the latency and improve the processing efficiency by truncating a length of one or more of the user-side features, as described more fully below.

To reduce the computational processing and latency by the online system 140 in retrieving ads, the Megataxon inverted index module 255 may implement truncated lengths of one or more user-side features. Referring back to the example embodiment of FIG. 9, in an instance in which the Megataxon inverted index module 255 reduces the user-side feature length to 2 for User_i, the Megataxon path hash for User_i may be [PATH_1, PATH_2]. As such, during the matching process, the Megataxon inverted index module 255 may only need to consider PATH_1 and PATH_2 as opposed to PATH_1, PATH_2 and PATH_3 in the original example of FIG. 9. In this regard, by considering fewer paths for a user associated with user-side features, the Megataxon inverted index module 255 may enable the online system 140 to conserve processing resources during the matching process.

Referring to FIG. 10, a diagram illustrating one or more truncated user-side Megataxon inverted index features is provided according to an exemplary embodiment. The longer the path length of the user-side features, the more latency and/or computational processing the online system 140 may experience due to real-time increased processing of user-ad value pairs for each of the respective paths. As shown in table 1000 of FIG. 10, the Megataxon inverted index module 255 determined that the maximum path feature length value of 60 for Megataxon inverted index feature DW_MEGATAXON_AD_IMPRESSION_D7 should be truncated to a maximum path feature length value of 5. The Megataxon inverted index module 255 also determined that the maximum path feature length value of 34 for Megataxon inverted index feature DW_MEGATAXON_ONSITE_EVENT_D7 should be truncated to a maximum path feature length value of 5. In some exemplary embodiments, the Megataxon inverted index module 255 may determine the truncation lengths based on computational efficiency/cost and user feature coverage analysis and the truncation lengths may be configurable parameters. In this manner, based on the Megataxon inverted index module 255 considering fewer paths for a user associated with user-side features, the online system 140 is capable of conserving processing resources and reducing latency. For example, the truncated features may enable the online system to consume less processing resources (e.g., a 20% reduction in processing resources) as compared to untruncated features.

Additionally, the Megataxon inverted index module 255 determined that the maximum path feature length value of 2 associated with Megataxon inverted index feature DW_MEGATAXON_AD_CLICK_D1 and the maximum path feature length value of 6 associated with DW_MEGATAXON_AD_CLICK_D7 is not too high. In some example embodiments, the Megataxon inverted index module 255 may determine that the feature length values of 2 and 6 are not too high based on detecting that the processing resources associated with these two Megataxon inverted index features are reasonable, for example, at a level that does not constrain the online system 140. As such, the Megataxon inverted index module 255 may decide not to truncate the path lengths for these Megataxon inverted index features.

By utilizing the Megataxon inverted index features described herein as inputs to the Wide part (e.g., user-ad interaction features) of a DWNN model, the online system 140 such as, for example, a social networking system may determine a Normalized Entropy (NE) gain improvement (e.g., a 0.05% NE gain improvement). The Normalized Entropy is a metric indicative of the performance of the DWNN.

As an exemplary embodiment of the online system 140 utilizing Megataxon based inverted index features to retrieve ads consider the following example for purposes of illustration and not of limitation. In this example embodiment, consider a manner in which the Megataxon inverted index module 255 implements the DW_MEGATAXON_AD_CLICK_D1 Megataxon inverted index feature. In other example embodiments, the Megataxon inverted index module 255 may implement the DW_MEGATAXON_AD_CLICK_D7, DW_MEGATAXON_AD_IMPRESSION_D7 and DW_MEGATAXON_ONSITE_EVENT_D7 inverted index features in like manner. The DW_MEGATAXON_AD_CLICK_D1 Megataxon inverted index feature has determined user-side features associated with determined ad-side features, as shown in table 800 of FIG. 8.

Figure 11:
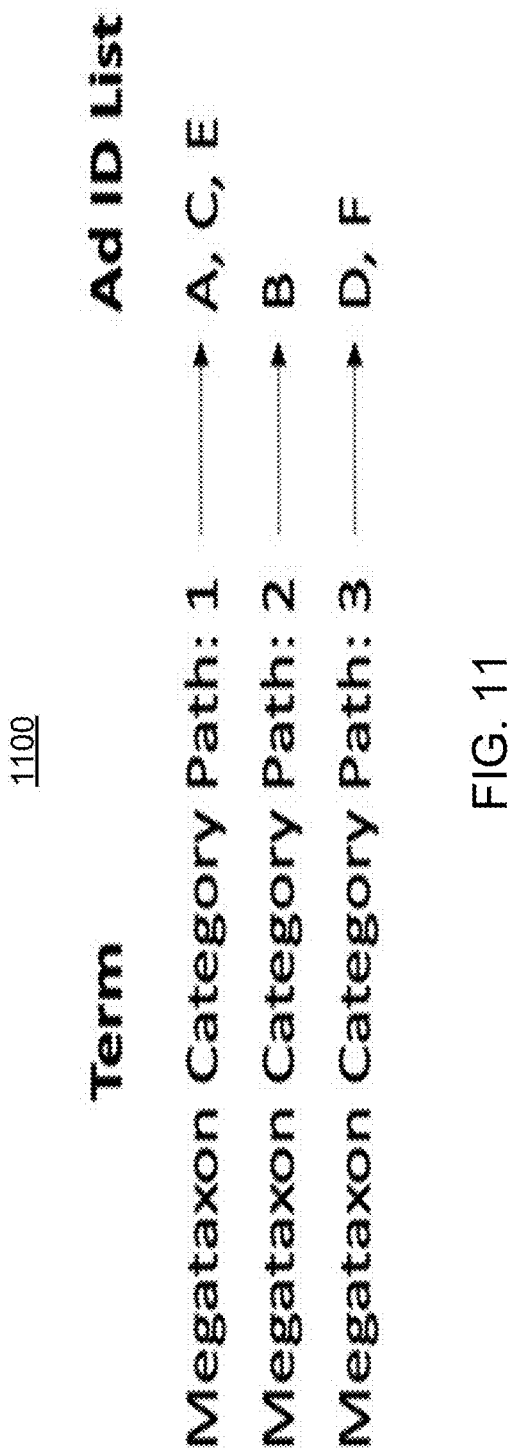
FIG. 11 is a diagram of an exemplary Megataxon inverted index in accordance with an embodiment.

Referring now to FIG. 11, an example of a diagram illustrating an inverted index 1100 according to an example embodiment is shown. In the example of FIG. 11, presume that the ad-side features associated with DW_MEGATAXON_AD_CLICK_D1 inverted index features is GSF_IDLIST_ADU_ADTAXON_I18N_PREDICTION_TOP1_LO_L7, which may represent the Megataxon category path of an ad (e.g., Megataxon Category Path in table 800 of FIG. 8). By using these ad-side features consider, for example, an Ad A, Ad C and Ad E which may be associated with Megataxon Category Path 1. Further, Ad B may be associated with Megataxon Category Path 2. Additionally, Ad D and Ad F may be associated with Megataxon Category Path 3. In this manner, as described above, each of the ads of an online system may be associated with a unique category path in the Megataxon category hierarchy.

In this example, the user-side features associated with the DW_MEGATAXON_AD_CLICK_D1 Megataxon inverted index feature are F3_ADFINDER_USER_ADS_CONTENT_UNDERSTANDING_USER_CLICKED_I18N_AD S_CATEGORIES_USER_ENGAGED_ADS_CLICK_COUNT_D1_FULL, as shown in table 800 of FIG. 8. These user-side features may represent the top Megataxon paths of ads, or types of associated ads, that a user of an online system has clicked on during the prior day (e.g., within the last 24 hours). For example, the Megataxon inverted index module 255 may determine that a User U has user-side feature values [1, 2]. The user-side feature values [1, 2] may denote that User U clicked, the most, on ads which have Megataxon category path 1 and Megataxon category path 2 during the prior day.

In response to the Megataxon inverted index module 255 extracting the determined feature values [1, 2] for inverted index Megataxon feature DW_MEGATAXON_AD_CLICK_D1, the Megataxon inverted index module 255 may utilize the feature values [1, 2] as search keys to search terms in the ad-side of the inverted index 1100, for example, in the Ad ID List shown in FIG. 11.

In this example, the search keys may be Megataxon Category Path: 1 and Megataxon Category Path: 2 since the determined user-side features values are [1, 2] for User U. In this example, the ads indicated in the ad-side of the inverted index 1100 (e.g., indicated in the Ad ID List) may be associated with three Megataxon paths i.e., Megataxon Category Path 1, Megataxon Category Path 2 and Megataxon Category Path 3, as shown in FIG. 11. The Megataxon inverted index module 255 may determine that the common path(s) between the user-side features and the ad-side features are Megataxon Category Path 1 and Megataxon Category Path 2.

For each of Ads A, B, C and E, there is one matched paths (e.g., Megataxon Category Path 1 for Ads A, C, E, and Path 2 for ad B) determined by the Megataxon inverted index module 255, the Megataxon inverted index module 255 may obtain a total weight of value 1 for each user-ad pair. Given that the total weight has a value of 1, which equals the predetermined threshold value of 1, Ads A, B, C and E may have non-zero DW_MEGATAXON_AD_CLICK_D1 feature values of 1 (e.g., the total weight) assigned by the Megataxon inverted index module 255 for User U. In this regard, a non-zero feature value(s) may be the value(s) of the total weight. The Megataxon inverted index module 255 may also determine that Ads D and F have zero values since there was no match regarding Megataxon Category Path 3.

The Megataxon inverted index module 255 may provide the non-zero value associated with Ads A, B, C and E as inputs and the zero feature values associated with Ads D and F to the Wide part of the DWNN. In this regard, the DWNN machine learning module 235 may implement the DWNN model (e.g., DWNN 200) to determine a final prediction as to Ads A, B, C, E as well as D and F. Since Ads A, B, C and E have non-zero feature values and Ads D and F have zero feature values, the Ads A, B, C and E may have a higher chance for retrieval as candidate ads for presentation to User U via a client device 110.

Further, the non-zero feature values associated with Ads A, B, C and E provided as inputs to the DWNN model (e.g., DWNN 200) may be combined with a User embedding and Ad embedding product (e.g., $emb_{user} \cdot emb_{ad}$) in a weighted sum manner and may be utilized by the DWNN machine learning module 235 to determine a prediction result of each of the models (e.g., Ad embedding, User Embedding and Wide part) of the DWNN model. As described above, a prediction may be determined from $\sigma(w_0 * emb_{user} \cdot emb_{ad} + W \cdot interFeatures_{user\_ad})$, where $\sigma$ is the sigmoid function, $w_0$ and W may be learned during a machine learning training process and W is a k dimensional vector. Further, the $interFeatures_{user\_ad}$ is a k dimensional vector that includes user-ad interaction features such as, for example, DW_MEGATAXON_AD_CLICK_D1. In some exemplary embodiments, since there may be multiple ranking events (e.g., clicks, impressions, onsite events, etc.), the DWNN machine learning module 235 may utilize multiple DWNN models to predict the result of each ranking event. As an example, for a click ranking event, a result of $\sigma(w_0 * emb_{user} \cdot emb_{ad} + W \cdot interFeatures_{user\_ad})$ may be one prediction result from one DWNN model based on implementing click-based user-ad interaction features such as, for example, DW_MEGATAXON_AD_CLICK_D1. As another example, for an onsite conversion ranking event, a result of $\sigma(w_0 * emb_{user} \cdot emb_{ad} + W \cdot interFeatures_{user\_ad})$ may be one prediction result from one DWNN model based on implementing onsite-event-based user-ad interaction features such as, for example, DW_MEGATAXON_ONSITE_EVENT_D7, so on and so forth. In this manner, the DWNN machine learning module 235 may implement multiple DWNN models for different ranking events to determine a final score for ads. The DWNN machine learning module 235 may combine the prediction results of each of the DWNN models to determine a final score for each ad of a plurality of ads of the online system 140. For example, the final score=pacing_multiplier*max_bid*eCTR*eCVR+ quality_bid. The eCTR and eCVR are prediction results from two DWNN models. The pacing_multiplier, max_bid, and quality_bid may be determined by other system components. By combining each of these parameters together, the final score for an ad(s) may be determined. The DWNN machine learning module 235 may use the final scores to sort the candidate ads in an ordered manner such as, for example, a descending order according to highest to lowest scores.

The DWNN machine learning module 235 may determine that the top ads (e.g., top 100 ads, etc.) with highest scores may be utilized for the Ads retrieval/delivery process.

Figure 12:
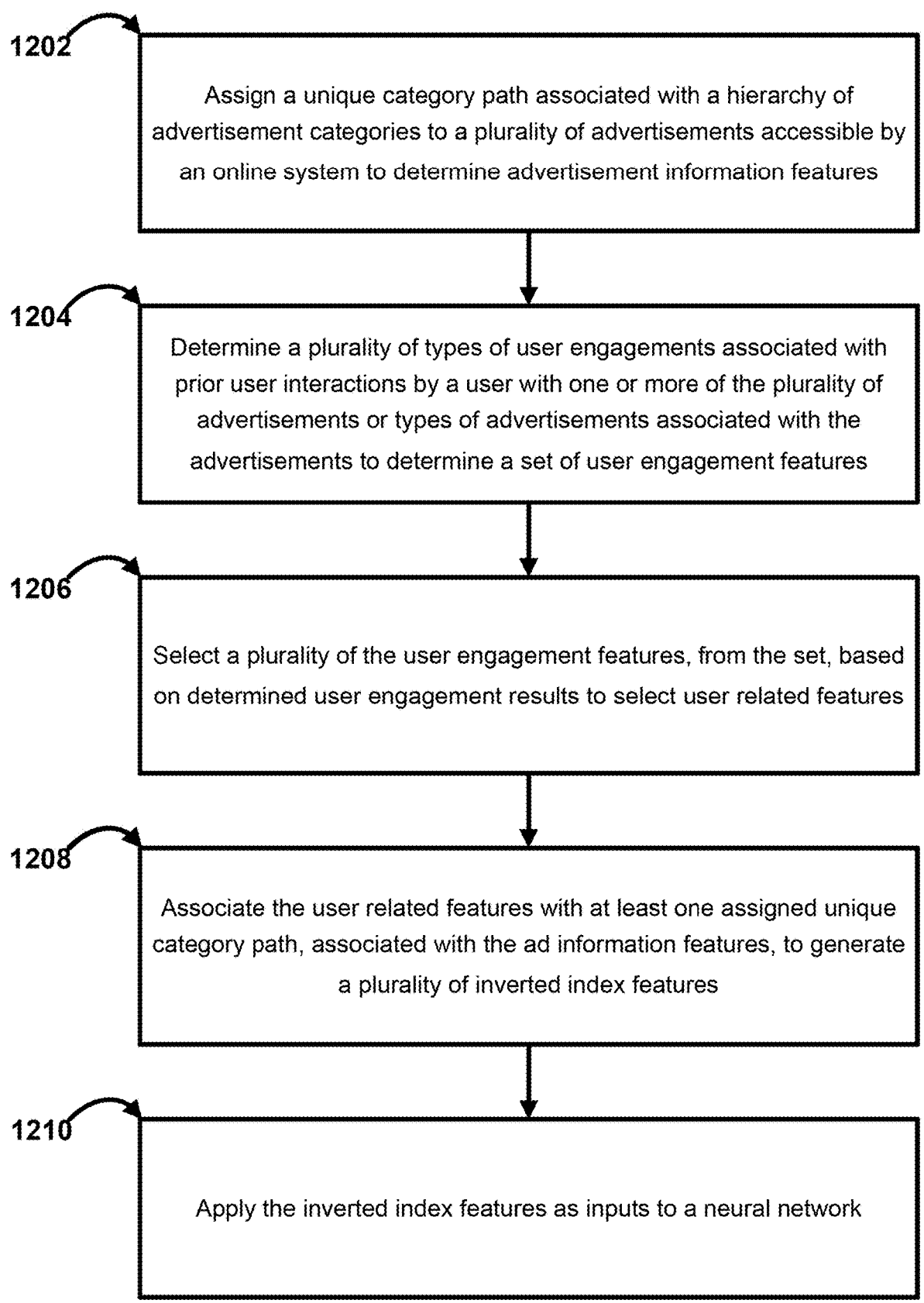
FIG. 12 is a flow chart of an exemplary method for determining candidate advertisements for retrieval and/or presentation to users of an online system, in accordance with an embodiment.

FIG. 12 illustrates an example flowchart illustrating operations for determining candidate advertisements for retrieval and/or presentation to users of an online system according to an exemplary embodiment. At operation 1202, an online system (e.g., network device 140) may assign a unique category path associated with a hierarchy of advertisement categories to a plurality of advertisements accessible by the online system to determine advertisement information features (also referred to herein as ad-side features). The advertisements may be accessible by the online system via storage devices (e.g., ROM 202, RAM 203). In some example embodiments, a portion (e.g., a subset) of the advertisements may be received by the online system from one or more content provider systems 130 and may be stored by the online system in the storage devices. In an example embodiment, the unique category path assigned by the online system may be a MegaTaxon Category Path as follows, GSF_IDLIST_ADU_ADTAXON_I18N_PREDICTION_ TOP1_LO_L7 (See e.g., FIG. 8).

At operation 1204, the online system (e.g., network device 140) may determine a plurality of types of user engagements associated with prior user interactions by a user with one or more of the plurality of advertisements, or types of advertisements associated with the advertisements, to determine a set of user engagement features. An example of the types of user engagements determined by the online system may be user interactions with content such as for example ads relating to user clicks, user impressions, user event activity (e.g., onsite events) by a corresponding user (e.g., User U). In some example embodiments, event activity may be associated with an onsite event indicative of user activity occurring at a physical location of an entity (e.g., a merchant) associated with one or more advertisements. The physical location may be, for example, a store in which a user visits and enters to make a purchase in response to being presented with one or more advertisements associated with the entity. An example of a set of user engagement features may be the user engagement features such as user-side features indicated in list 700 shown in FIG. 7.

At operation 1206, the online system (e.g., network device 140) may select a plurality of the user engagement features, from the set of user engagement features, based on determined user engagement results, with correlation analysis, to select user related features (also referred to herein as user-side features). An example of the user related features selected by the online system are indicated in the user-side features column of table 800 shown in FIG. 8.

At operation 1208, the online system (e. LY network device 140) may associate the user related features (e.g., user-side features) with at least one assigned unique category path, associated with the ad information features (e.g., ad-side features), to generate a plurality of inverted index features. The assigned unique category path may be MegaTaxon Category Path referred to as GSF_IDLIST_ADU_ADTAXON_I18N_PREDICTION_ TOP1_LO_L7.

Also, for example as shown in FIG. 8, the online system 140 generated the following inverted index features (also referred to herein as Megataxon inverted index features) having user-side features associated with ad-side features, DW_MEGATAXON_AD_CLICK_D1;
DW_MEGATAXON_AD_CLICK_D7:
DW_MEGATAXON_AD_IMPRESSION_D7: and
DW_MEGATAXON_ONSITE_EVENT_D7.

At operation 1210, an online system (e.g., network device 140) may apply the inverted index features as inputs to a neural network such as, for example, a Deep Neural Network. In example embodiments, the online system may apply the inverted index features inputs to a Deep and Wide Neural Network. For example, the inverted index features may be applied as inputs to a Wide part of the Deep and Wide Neural Network (e.g., DWNN 200). The Wide part may relate to user interaction features associated with items of advertisement content.

The online system (e.g., network device 140) may determine whether one or more advertisements are candidate advertisements for retrieval and/or presentation to a corresponding user(s) (e.g., User U) in response to the Deep and Wide Neural Network implementing, for example via DWNN machine learning module 235, the inverted index features. The candidate advertisements may be considered by the online system for retrieval/presentation in response to an ad retrieval instance/time (e.g., ad serving time) for an ads delivery process. In some exemplary embodiments, the ad retrieval instance/time may be in response to an ad request(s), in a manner as described above.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    assigning, by a network device, at least one unique category path associated with a hierarchy of advertisement (ad) categories to a plurality of advertisements accessible by the network device to determine ad information features;
    determining a plurality of types of user engagements associated with prior user interactions by a corresponding user with one or more of the plurality of advertisements or types of advertisements associated with the one or more of the plurality of advertisements to determine a set of user engagement features;
    selecting a plurality of the user engagement features, from the set, based on determined user engagement results to obtain user related features;
    associating the user related features with the assigned at least one unique category path, associated with the ad information features, to generate a plurality of inverted index features;
    applying the inverted index features as inputs to a neural network, wherein the neural network comprises a Deep and Wide Neural Network; and
    determining, based on the inverted index features as the inputs, at least one Normalized Entropy gain associated with the neural network.

2. The method of claim 1, further comprising:
    analyzing at least one of the user related features associated with at least one of the inverted index features to determine feature values corresponding to one or more user paths associated with one or more prior interactions by the user with advertisements or corresponding advertisement types.

3. The method of claim 2, further comprising:
    analyzing one or more ad paths corresponding to advertisements identified in a content indication corresponding to the ad information features associated with the at least one inverted index feature; and
    determining whether one or more of the user paths match corresponding ad paths associated with the ad information features.

4. The method of claim 3, further comprising:
    assigning a predetermined weight value to the determined user paths that match the corresponding ad paths to determine a total weight value;
    applying a non-zero value to one or more advertisements associated with the determined user paths that match the corresponding ad paths in response to determining that the total weight value equals or exceeds a predetermined threshold value; and
    determining that the one or more advertisements associated with the determined user paths that match the corresponding ad paths are candidate advertisements to at least one of retrieve or present to the user in response to applying the non-zero value.

5. The method of claim 1, wherein applying further comprises applying the inverted index features as the inputs to a Wide part, of the Deep and Wide Neural Network, relating to user interaction features associated with advertisement content.

6. The method of claim 1, wherein the types of user engagements comprise click engagement, impression engagement or user engagement associated with an event indicative of user activity occurring at a physical location of an entity associated with at least one of the plurality of advertisements.

7. The method of claim 1, wherein the inverted index features are stored in an indexed index within a memory device.

8. The method of claim 1, further comprising:
determining whether the one or more of the plurality of advertisements are candidate advertisements for at least one of retrieval or presentation to a client device associated with the user in response to the Deep and Wide Neural Network implementing the inverted index features.

9. The method of claim 8, wherein prior to determining whether the advertisements are candidate advertisements, the method further comprises:
truncating a feature length value associated with one or more of the user related features that exceeds a predetermined threshold value.

10. A computer program product comprising a non-transitory computer readable storage medium having instructions encoded thereon which, when executed by a processor, cause:
assigning, by a network device, at least one unique category path associated with a hierarchy of advertisement (ad) categories to a plurality of advertisements accessible by the network device to determine ad information features;
determining a plurality of types of user engagements associated with prior user interactions by a corresponding user with one or more of the plurality of advertisements or types of advertisements associated with the one or more of the plurality of advertisements to determine a set of user engagement features;
selecting a plurality of the user engagement features, from the set, based on determined user engagement results to obtain user related features;
associating the user related features with the assigned at least one unique category path, associated with the ad information features, to generate a plurality of inverted index features;
applying the inverted index features as inputs to a neural network, wherein the neural network comprises a Deep and Wide Neural Network; and
determining, based on the inverted index features as the inputs, at least one Normalized Entropy gain associated with the neural network.

11. The computer program product of claim 10, wherein the non-transitory computer readable storage medium further comprises instructions encoded thereon which, when executed, cause:
analyzing at least one of the user related features associated with at least one of the inverted index features to determine feature values corresponding to one or more user paths associated with one or more prior interactions by the user with advertisements or corresponding advertisement types.

12. The computer program product of claim 11, wherein the computer readable storage medium further comprises instructions encoded thereon which, when executed, cause:
analyzing one or more ad paths corresponding to advertisements identified in a content indication corresponding to the ad information features associated with the at least one inverted index feature; and
determining whether one or more of the user paths match corresponding ad paths associated with the ad information features.

13. The computer program product of claim 12, wherein the non-transitory computer readable storage medium further comprises instructions encoded thereon which, when executed, cause:
assigning a predetermined weight value to the determined user paths that match the corresponding ad paths to determine a total weight value;
applying a non-zero value to one or more advertisements associated with the determined user paths that match the corresponding ad paths in response to determining that the total weight value equals or exceeds a predetermined threshold value; and
determining that the one or more advertisements associated with the determined user paths that match the corresponding ad paths are candidate advertisements to at least one of retrieve or present to the user in response to applying the non-zero value.

14. The computer program product of claim 10, wherein applying further comprises applying the inverted index features as the inputs to a Wide part, of the Deep and Wide Neural Network, relating to user interaction features associated with advertisement content.

15. The computer program product of claim 10, wherein the types of user engagements comprise click engagement, impression engagement or user engagement associated with an event indicative of user activity occurring at a physical location of an entity associated with at least one of the plurality of advertisements.

16. The computer program product of claim 10, wherein the non-transitory computer readable storage medium further comprises instructions encoded thereon which, when executed, cause:
determining a Normalized Entropy metric indicative of the performance of the Deep and Wide Neural Network.

17. The computer program product of claim 10, wherein the non-transitory computer readable storage medium further comprises instructions encoded thereon which, when executed, cause:
determining whether one or more of the plurality of advertisements are candidate advertisements for at least one of retrieval or presentation to a client device associated with the user in response to the Deep and Wide Neural Network implementing the inverted index features.

18. The computer program product of claim 17, wherein prior to determining whether the advertisements are candidate advertisements, the non-transitory computer readable storage medium further comprises instructions encoded thereon which, when executed, cause:
truncating a feature length value associated with one or more of the user related features that exceeds a predetermined threshold value.

19. A system comprising:
a device comprising one or more processors; and
at least one memory storing instructions, that when executed by the one or more processors, cause the device to:
- assign at least one unique category path associated with a hierarchy of advertisement (ad) categories to a plurality of advertisements accessible by the device to determine ad information features;
- determine a plurality of types of user engagements associated with prior user interactions by a corresponding user with one or more of the plurality of advertisements or types of advertisements associated with the one or more of the plurality of advertisements to determine a set of user engagement features;
- select a plurality of the user engagement features, from the set, based on determined user engagement results to obtain user related features;
- associate the user related features with the assigned at least one unique category path, associated with the ad information features to generate a plurality of inverted index features;
- apply the inverted index features as inputs to a neural network, wherein the neural network comprises a Deep and Wide Neural Network; and
- determine, based on the inverted index features as the inputs, at least one Normalized Entropy gain associated with the neural network.

20. The system of claim 19, wherein when the one or more processors further execute the instructions, further causes the device to:
analyze at least one of the user related features associated with at least one of the inverted index features to determine feature values corresponding to one or more user paths associated with one or more prior interactions by the user with advertisements or corresponding advertisement types.

* * * * *